United States Patent [19]

Akiyama et al.

[11] Patent Number: 4,669,306
[45] Date of Patent: Jun. 2, 1987

[54] HEAT-WIRE TYPE AIR FLOW MEASUREMENT APPARATUS

[75] Inventors: Susumu Akiyama, Kariya; Katsunori Ito, Aichi; Toshitaka Yamada, Nagoya; Tiaki Mizuno, Toyota; Masumi Kinugawa, Okazaki, all of Japan

[73] Assignee: Nippondenco Co., Ltd., Kariya, Japan

[21] Appl. No.: 743,492

[22] Filed: Jun. 11, 1985

[30] Foreign Application Priority Data

Jun. 13, 1984 [JP] Japan .................. 59-121518

[51] Int. Cl.$^4$ ............................................. G01F 1/68
[52] U.S. Cl. ................................... 73/204; 73/118.2
[58] Field of Search ............... 73/118, 204; 123/494

[56] References Cited

U.S. PATENT DOCUMENTS

| | | | |
|---|---|---|---|
| 3,803,913 | 4/1974 | Tracer | 73/204 |
| 3,928,800 | 12/1975 | Strenglein | 73/204 X |
| 4,043,195 | 8/1977 | Hunting | 73/204 |
| 4,058,089 | 11/1977 | Schmidt et al. | |
| 4,196,622 | 4/1980 | Peter | 73/204 |
| 4,322,970 | 4/1982 | Peter | |
| 4,334,186 | 6/1982 | Sasayama et al. | 73/204 X |
| 4,373,383 | 2/1983 | Plapp et al. | 73/204 X |
| 4,445,368 | 5/1984 | Sumal | 73/204 X |
| 4,565,091 | 1/1986 | Ito et al. | 73/204 X |

FOREIGN PATENT DOCUMENTS 0087421 4/1986 Japan ......................... 73/204

Primary Examiner—Herbert Goldstein
Attorney, Agent, or Firm—Cushman, Darby & Cushman

[57] ABSTRACT

A heat generating element having a thermal characteristic such that its resistance varies in response to changes in temperature is provided in the intake pipe of an engine. A heating power, the voltage of which is set by a reference voltage source, is supplied to the heat generating element via a transistor. The supply of this heating power is controlled by a start pulse signal periodically generated by a set flip-flop circuit when the ignition switch is on. When the heat generating element reaches a predetermined temperature, the supply is cut off by the flip-flop circuit. A measurement signal having a pulse width corresponding to the time period of heating power supply is generated from the flip-flop circuit. The opening of the ignition switch is detected and a one-shot multivibrator is driven to produce a burn-off signal having a pulse width to which the burn-off period corresponds. This burn-off control signal turns the transistor on and heating power is supplied to the heat generating element and the voltage of the reference power source is reduced so that the voltage of the heating power is switched to a low level.

16 Claims, 12 Drawing Figures

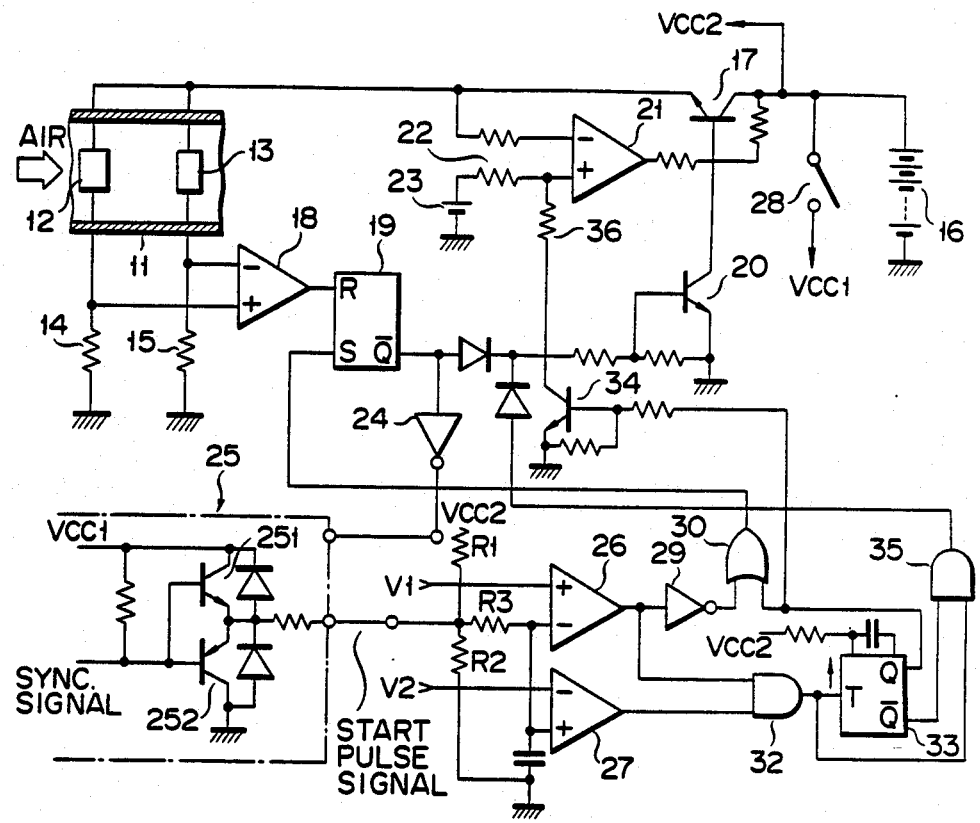

HEAT-WIRE TYPE AIR FLOW MEASUREMENT APPARATUS

BACKGROUND OF THE INVENTION

This invention relates generally to a heat-wire type air flow measurement apparatus for measuring the air flow in the intake pipe of an engine, for example, and particularly to a heat-wire type air flow measurement device which is used to detect control data corresponding to the running state of an automobile engine in the electronic control of the engine.

When an engine is controlled electronically, a control device detects signals corresponding to the running state of the engine, and calculates the amount of fuel to be injected, ignition timing, etc. based on these signals. Examples of this kind of engine monitoring means are an engine speed detector, coolant temperature detector, exhaust gas temperature detector and throttle opening detector, etc. An example of means for direct detection of the operating state of the engine is intake air volume detecting means, of which the heat-wire type air flow measurement apparatus is well known.

With this kind of measurement apparatus a heat generating element having a thermal resistance characteristic is placed in the intake pipe and heating power is supplied to the element. The heat generating element is exposed to the cooling effect of the intake air flow so the thermal dissipation of the element is proportional to the amount of air flowing in the pipe. The velocity of the increase in temperature when the supply of heating power to the element is set is related to the volume of air flowing in the intake pipe, and, by monitoring this temperature increase, it is possible to measure the amount of air flowing in the intake pipe.

With this kind of measuring device, however, the element is placed in the intake pipe for long periods of time resulting in dust adhering to the device, which in turn causes variations in the thermal transmissivity of the element surface, erroneous measurement of air flow volume and makes it impossible to supply accurate data to the engine control system.

To solve this kind of a problem, U.S. Pat. No. 4,322,970, for example, discloses the burning off of this dust adhering to the element by raising its temperature to 800° C. When the air flow measurement device is applied to an engine control system, the heat generating element is temporarily heated based on the instruction from the microcomputer constituting the control system. Normally this kind of burn-off command would be given when the engine is stopped, i.e., the ignition switch has been turned off.

Even after the operator of the vehicle has turned off the ignition switch, the power source for the control unit is temporarily left on to burn off the dust on the element, which requires that the power to the control unit be turned off after burn off is completed. Consequently, the control unit requires a complicated structure.

SUMMARY OF THE INVENTION

An object of the invention is to provide a heat-wire type air flow measurement apparatus effectively for measuring the intake air flow of an automobile engine, which can automatically perform burning off after the electronic control unit has been turned off without requiring a special command from the control unit.

Another object of the invention is to provide a heat-wire type air flow measurement apparatus which can reliably perform maintenance of the heat generating element to ensure the accurate measurement of the intake air flow over a long period of time by automatically starting burn off at the time the control switch is turned off without providing the control unit with special means for controlling the burn off and without making the construction of the engine control system complicated.

Another object of the invention is to provide a heat-wire type air flow measurement apparatus, which detects a change in the signal from the control unit, which corresponds to the turning off of the control switch of the control unit and performs the burn-off operation based on this signal to simply control the burn off in response to the turning off of the engine.

Another object of the invention is to ensure the accurate measurement of the intake air by detecting the absence of a start pulse signal used in measuring the air flow and starting the burn-off operation and automatically performing the burn off without the air flow measurement operation being performed to thereby ensure the reliable performance of the functions of the heat generating element.

The air flow measurement apparatus of this invention periodically generates a start pulse signal when the system control switch, which is a part of the ignition switch, is turned on. This start pulse signal causes heating power to be supplied to the heat generating element in the intake pipe to heat it and cuts off the power when the element reaches a specified temperature. The output signal is a pulse signal having a pulse width corresponding to the time that the heating power is supplied. When the system control switch is turned off, this is detected and the burn-off timesetting means is started. Heating power is supplied to the heat generating element for this burn off during the time period set by this means.

With this kind of air flow measurement apparatus the control switch is turned on and, together with the generation of a start pulse signal, heating power to the heat generating element is turned on and a measurement output signal for the volume of air flowing in the intake pipe is obtained. When the control switch is turned off, i.e., when the engine is turned off, it is detected that the control switch has been turned off unrelated to the engine control unit and the burn-off time-setting means is started to perform the burn-off operation. Namely, when the engine is turned off, the dust adhering to the heat generating element is reliably burnt off without any extra work on the part of the engine control unit.

BRIEF DESCRIPTION OF THE DRAWINGS

This invention may be better understood with reference to the drawings in which:

FIG. 1 is a circuit diagram of the heat-wire type air flow measurement apparatus for measuring the intake air flow in an engine, according to the first embodiment of the invention;

FIGS. 2A to 2D are time charts showing the different operation states of the above apparatus;

DETAILED DESCRIPTION OF THE PREFERRED EMBODIMENTS

Figure 3:
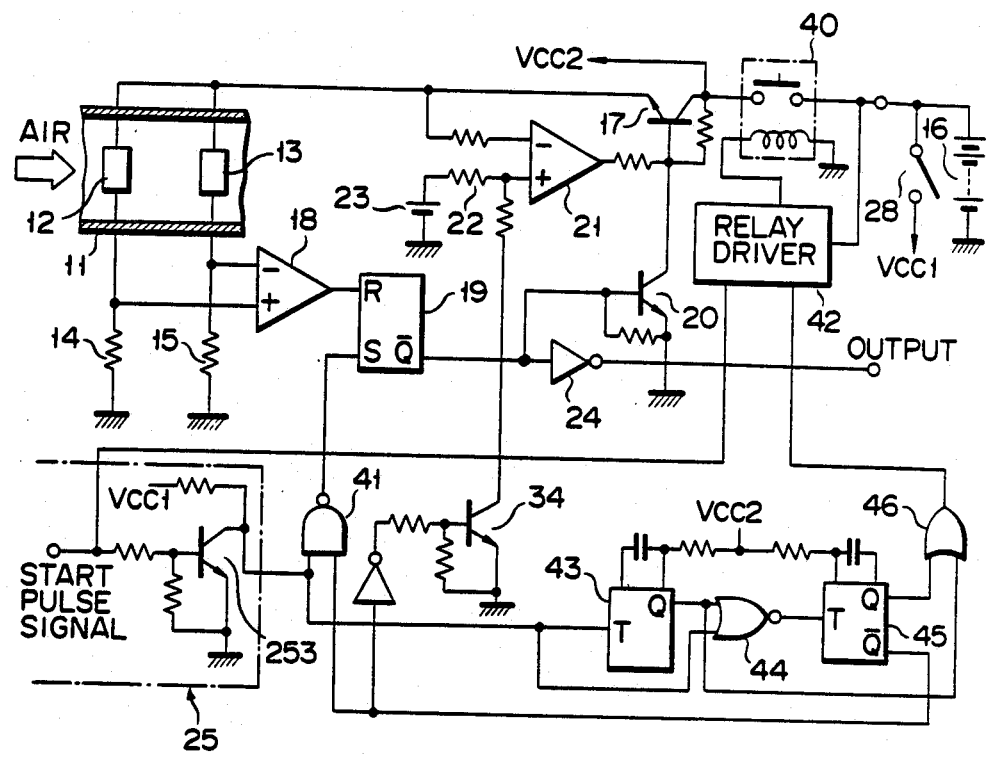
FIG. 3 is a circuit diagram of the second embodiment of the invention.

FIG. 1 shows an embodiment used in an engine control system for measuring the intake air flow. Heat generating element 12 is mounted in the engine intake pipe 11. Heat generating element 12 comprises a heater which has a wire made of platinum, for example, that has a thermal characteristic whereby the resistance is varied in response to changes in temperature. This heat generating element 12 is cooled by the flow of air in intake pipe 11.

An air temperature sensing element 13, which comprises a resistance wire having the same thermal characteristics as element 12, is also located in intake pipe 11. The resistance of air temperature sensing element 13 varies in response to the temperature of the air flowing in intake pipe 11.

Heat generating element 12 and air temperature sensing element 13 are respectively connected to fixed resistance elements 14 and 15 to form a bridge circuit. Heating power from a source 16 such as a car battery is supplied to this bridge circuit via transistor 17 which is the heating power control element.

The output terminal section of the above bridge circuit is connected to comparator 18. When the temperature of heat generating element 12 rises above the specified temperature difference between it and the air flow as measured by air temperature sensing element 13, an output signal is supplied from comparator 18 to reset flip-flop circuit 19.

When flip-flop circuit 19 is reset, an output signal is supplied from the $\bar{Q}$ terminal to turn on transistor 20. Transistor 20 controls transistor 17 so when flip-flop circuit 19 is set, transistor 17 is turned on, and when flip-flop circuit 19 is reset, transistor 20 is turned on and transistor 17 is turned off. Heating power is supplied to the circuit section of heat generating element 12 via transistor 17 when it is turned on.

The voltage of the power supplied to the bridge circuit is detected through a resistor by OP amplifier 21 which compares it with the reference voltage set by reference voltage source 23 connected via resistor 22 and controls the base potential of transistor 17. In other words, OP amp 21 comprises a constant voltage control circuit for setting the voltage of the power supplied to the bridge circuit at the reference voltage.

The output signal from the $\bar{Q}$ terminal of flip-flop 19 is inverted by inverter 24 and supplied to engine control unit 25. Engine control unit 25, details of which are not shown, comprises a microcomputer, which detects the air flow measurement signal together with signals indicating the operating state of the engine, such as intake air temperature, coolant temperature, engine speed, throttle opening, and battery 16 voltage, etc., and, based on these signals, the control unit calculates and controls the fuel injection amount and the ignition timing.

Engine control unit 25, which generates a start pulse signal synchronously with the rotation of the engine, has transistors 251 and 252 as the pulse signal generating means. A signal synchronous with the rotation of the engine is supplied to the bases of transistors 251 and 252 to alternately turn each transistor on and off and thereby generate a start pulse signal matching the synchronous signal. This start pulse signal is supplied to first and second comparators 26, 27 through resistor R3.

Reference voltages V1 and V2 are supplied to first and second comparators 26, 27 and compared with the start pulse signal from engine control unit 25. The power source Vcc1 for engine control unit 25 is supplied from battery 16 through ignition (IG) switch 28 to which it is connected to generate a start pulse signal that has a high level at Vcc1 and a low level at ground potential. As shown in FIG. 2A, reference voltages V1 and V2 have the relationship of V1>V2. V1 is lower than Vcc1 and V2 is higher than ground potential.

Power source Vcc2, which is supplied directly, not through IG switch 28, is divided by resistors R1 and R2 to form voltage V3, which is supplied to first and second comparators 26 and 27 through resistor R3. Voltage V3 is set between the voltage values of V1 and V2. When engine control unit 25 is on and the start pulse is at low level, voltage V3 is grounded via transistor 252, and when IG switch 28 is turned off and engine control unit 25 is not operating, voltage V3 is supplied to first and second comparators 26 and 27.

Voltage V1 is set at 3.5 V, V2 is 1.5 V and V3 is therebetween. First comparator 26 generates a signal with an input voltage lower than reference voltage V1 and, accordingly, a negative start pulse signal is generated. Second comparator 27 generates an output signal when the input voltage is higher than reference voltage V2.

The output signal from first comparator 26 is supplied to OR circuit 30 via inverter 29, and the output of OR circuit 30 is supplied to flip-flop 19 as a set command signal. Flip-flop 19 is constructed to have a set priority so the setting is maintained even if a reset command is received during this time.

The output signals of second comparator 27 and first comparator 26 are supplied to AND circuit 32. The output signal of AND circuit 32 is supplied to monomultivibrator 33 as a trigger signal. Monomultivibrator 33 generates a pulse signal in response to the rise of the output signal from AND circuit 32 and corresponding to time period T1 (e.g. 3 sec). The output signal from the Q terminal of mono-multivibrator 33 is supplied to OR circuit 30 and to the base of transistor 34.

The voltage of reference voltage source 23, which is supplied to OP amp 21, is grounded via resistor 36 and transistor 34. When transistor 34 is turned on, the reference voltage is divided and a low level voltage is supplied to OP amp 21. Namely, because of the presence of the Q output from mono-multivibrator 33, the voltage of the power supplied to the bridge circuit, which includes heat generating element 12, is switched to a low level compared to when measuring is performed.

As shown in FIG. 2A, when IG switch 28 is turned off and the input signal voltage for first and second comparators 26 and 27 becomes V3, the output signal from AND circuit 32 rises and a signal having a time period T1 is output from the Q terminal of mono-multivibrator 33, as is shown in FIG. 2B. In this case, the signal from the $\bar{Q}$ terminal of mono-multivibrator 33 is inverted compared to the signal from the Q terminal. The signal from the $\bar{Q}$ terminal is supplied to AND circuit 35 together with the output signal from AND circuit 32. The output signal from AND circuit 35 is controlled by transistor 20 and is supplied to heat generating element 12 as the heating power when transistor 17 is turned on during time T1.

With an air flow measurement apparatus constructed in this way, when IG switch 28 for starting the system control is turned on and power source Vcc1 is supplied to engine control unit 25, a start pulse such as that shown in FIG. 2A is generated. This pulse sets flip-flop circuit 19 and is supplied to the bridge circuit including heat generating element 12 as heating power when transistor 17 is turned on. Namely, the temperature of the element 12 rises at a velocity in reverse proportion to the flow of air in intake pipe 11. This temperature continues to rise until it surpasses the temperature of the air, as measured by air temperature sensing element 13, by a specified amount, whereupon a signal is generated by comparator 18 and flip-flop circuit 19 is reset. Accordingly, when transistor 17 is turned on, the heating power to heat generating element 12 is cut off. This operation is repeated every time a start pulse signal is generated.

In this case, the temperature rise velocity of heat generating element 12 while heating power is being supplied is determined by the amount of heat released due to the flow of air in intake pipe 11. When the flow of air is large, the temperature rise velocity will be slow. Consequently, the interval between setting and resetting of flip-flop circuit 19 becomes proportional to the flow of air. The signal via inverter 24 has a pulse width corresponding to the time period of air flow.

FIG. 2C shows the state of the base signal of transistor 20 which is controlled by the operation of flip-flop circuit 19. The state of the heating power supplied to the bridge circuit which includes heat generating element 12 is shown in FIG. 2D. These drawings also show the voltage level of the signals, and are at the low level after IG switch 28 has been turned off.

With this kind of engine control, when the air flow is measured and IG switch 28 is turned off to stop the engine, the power source Vcc1 to engine control unit 25 is cut off and both transistors 251 and 252 are turned off. Consequently, the voltage to first and second comparators 26 and 27 becomes V3, and the signal from AND circuit 32 rises to trigger mono-multivibrator 33.

In other words, when IG switch 28 is turned off, a signal such as that shown in FIG. 2B is generated, flip-flop circuit 19 is set, transistor 17 is turned on and heating power is supplied to heat generating element 19. Also, at the same time transistor 34 is turned on and the voltage of the heating power supplied to heat generating element 12 is switched to the low level so even though heating power is being supplied, the temperature of the element 12 does not rise above the level at which heat damage would occur (e.g. 800° C.).

When mono-multivibrator 33 is reset, an output signal is obtained from AND circuit 35. This signal turns on transistor 20, and transistor 17, which supplies heating power to heat generating element 12, is turned off. In other words, heating power with a reduced voltage is supplied to the element 12 only for the time period T1, which is the period that monomultivibrator 33 is set, to burn off, at a temperature of 800° C., for example, dust adhering to the outer surface of heat generating element 12.

Flip-flop 19 is constructed to have set priority so that during the time that a signal from OR circuit 30 is being input to the set terminal, it remains set even if a signal from comparator 18 is input to the reset terminal. Accordingly, during the burn-off period when a signal is being output from the Q terminal of monomultivibrator 33, even if comparator 18 outputs a signal, flip-flop 19 remains set and transistor 17 is kept on.

In the above embodiment, power Vcc2 is always supplied to the portion of the circuit that performs the air flow measurement and is always present. However, it is possible to supply power only during the air flow measurement period and the burn-off control period.

FIG. 3 shows an embodiment which includes this point. Relay device 40 for power source control is inserted between battery 16 and transistor 17. Power Vcc2 is supplied as the heating power via relay device 40 to the bridge circuit including heat generating element 12.

According to this embodiment, engine control unit 25 is powered by Vcc1 supplied through IG switch 28. The start pulse signal, which is synchronous with the rotation of the engine, is inverted by transistor 253 and output to NAND circuit 41, which outputs a signal for setting flip-flop circuit 19. This start pulse signal is supplied without being inverted to relay driver 42 as the drive signal of relay device 40. Power is always supplied to relay driver 42 and, with the drive power thus supplied, a current is sent to an energizing coil of relay device 40 to turn on the relay switch.

The inverted start pulse signal is supplied to first retriggerable one-shot multivibrator 43. After the fall of the input signal, i.e., after the rise of the start pulse signal, one-shot multivibrator 43 generates a signal having a pulse width corresponding to the time period T2.

The output signal of first one-shot multivibrator 43 is supplied to NOR circuit 44 together with the inverted start pulse signal. Both input signals of NOR circuit 44 are supplied as low level trigger signals to second retriggerable one-shot multivibrator 45.

One-shot multivibrator 45 outputs a signal having a pulse width equal to time T3 from the Q terminal after the rise of the above trigger signal. The inverted signal from the $\overline{Q}$ terminal is supplied to NAND circuit 41 as a gate signal. The signal from the Q terminal is supplied to OR circuit 46 together with the output signal of first one-shot multivibrator 43. The output signal from OR circuit 46 is supplied to relay driver 42 as a relay drive command.

Figure 4A:
FIGS. 4A to 4F are time charts showing the different operation, states of the above apparatus.

With an air flow measurement apparatus constructed as described above, when IG switch 28 is turned on and power supplied to engine control unit 25, a start pulse signal having the shape shown in FIG. 4A is generated. Then, when this start pulse signal starts to rise, relay driver 40 operates and power is supplied to the measurement circuit including heat generating element 12. The inverted start pulse signal drives first one-shot multivibrator 43 and an output signal is generated from its Q terminal. In this case, the pulse time width T2 of the output signal from first one-shot multivibrator 43 is set sufficiently longer than the start pulse generation period. In particular, this time period is set such that there is sufficient time, for example 10 sec., to reliably determine that after IG switch 28 is turned off, the start pulse signal has been extinguished. First one-shot multivibrator 43 is driven every time a start pulse signal is generated and the pulse width of the output signal is set sufficiently longer than the period of start pulse signal so, while the start pulse signal is being produced, the Q output is maintained at the high level. Namely, the output signal from first one-shot multivibrator 43 has the shape shown in FIG. 4B.

In this case, second one-shot multivibrator 45 is reset and, accordingly, an output signal corresponding to the start pulse signal from NAND circuit 41, as shown in FIG. 4A, is generated to set flip-flop circuit 19. In other words, the same operation as that described in the previous embodiment is performed. Also, during this measurement operation, the output signal of first one-shot multivibrator 43 is supplied to relay driver 42 as a drive command signal so a reliable power source to the measurement circuit is ensured.

Figure 4B:
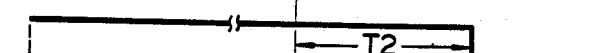

With this kind of air flow measurement, when IG switch 28 is turned on, the output signal from control unit 25 is set at the low level and the start pulse signal is not generated because power Vcc1 to engine control unit 25 is cut off. Accordingly, the signal supplied from control unit 25 to NOR circuit 44 is set at the low level. After IG switch 28 is turned off, the supply of signal corresponding to start pulse signal from control unit 25 to first one-shot multivibrator 43 is cut off. Accordingly, after time T2 has elapsed from the front edge of the start pulse signal just before IG switch 28 is turned off, an output signal from first one-shot multivibrator 43 falls, as shown in FIG. 4B. Together with the fall of this output signal, all the input signal to NOR circuit 44 become low level, the output signal from NOR circuit 44 rises and second one-shot multivibrator 45 is triggered. When second one-shot multivibrator 45 is set in this way, the $\overline{Q}$ output becomes low level and a set command signal is supplied from NAND circuit 41 to flip-flop circuit 19.

A Q output of one-shot multivibrator 45 is sent to relay driver 42 as a drive signal so the continuous supply of power to the measurement circuit containing heat generating element 12 is maintained. Accordingly, together with the setting of flip-flop circuit 19 heating power is supplied to the element 12. In this case, transistor 34 is turned on by the $\overline{Q}$ output of one-shot multivibrator 45 so the voltage of the heating power supplied to heat generating element 12 is switched to the low level.

That is to say, low-voltage heating power is supplied to heat generating element 12 during the time period T2 when the output signal from second one-shot multivibrator 45 exists, for example, 3 seconds, to perform the burn-off operation. When this 3-second burn-off is completed, second one-shot multivibrator 45 is reset, the drive command signal to relay driver 42 falls, relay device 40 is returned to an open-circuit state, and the power to the measurement circuit containing heat generating element 12 is cut off.

Flip-flop 19 in this embodiment has the same set priority as flip-flop 19 shown in FIG. 1.

Figure 4C:
Figure 4D:
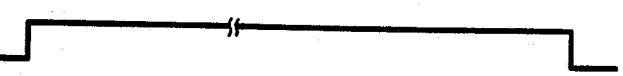
Figure 4E:
Figure 4F:

FIG. 4C shows the Q output of second one-shot multivibrator 45; FIG. 4D shows the drive command signal of relay device 40, which is supplied to relay driver 42; FIG. 4E shows the measurement output signal; and FIG. 4F shows the heating power supplied to the measurement circuit containing heat generating element 12.

Figure 5:
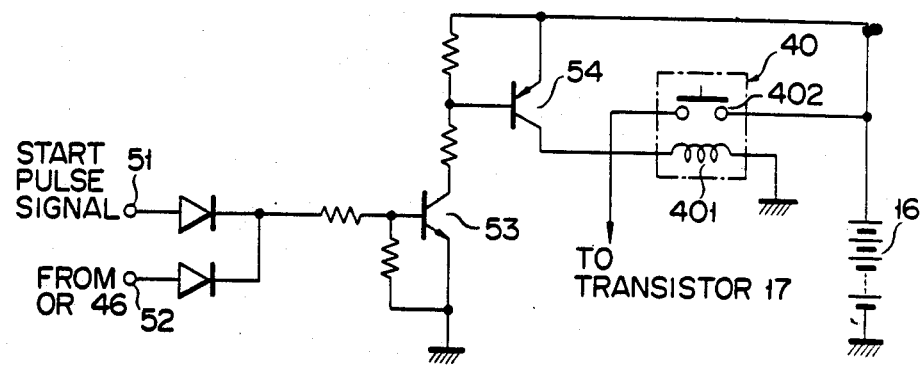
FIGS. 5 and 6 are circuit diagrams of the relay driver circuit used in the second embodiment.

FIG. 5 is a detailed circuit diagram of relay driver 42 to input terminals 51 and 52 of which a start pulse signal and the output signal from OR circuit 46 are respectively supplied. While input signals are being supplied to input terminals 51 and 52, transistor 53 is turned on, which turns on transistor 54, which is connected to power source 16, to supply an energizing current to relay coil 401. Namely, when an input signal exists at input terminals 51 and 52, an energizing current is supplied to relay coil 401 and relay switch 402 is closed.

Figure 6:
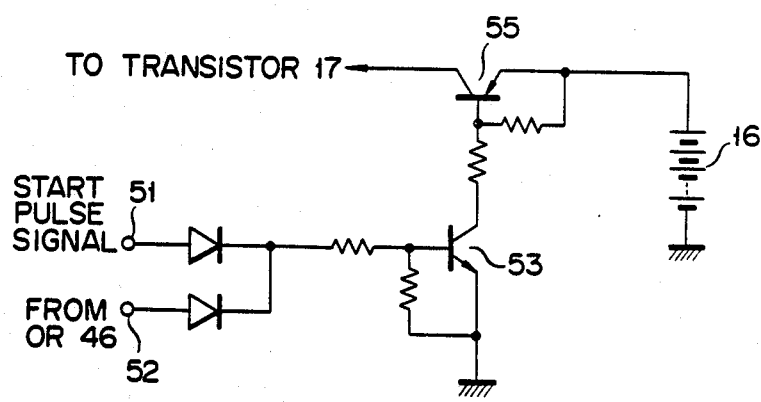

FIG. 6 shows another example of relay driver 42. In this example switch transistor 55 is used as relay device 40. The base of transistor 55 is controlled by transistor 53.

What is claimed is:

1. A heat-wire type air flow measurement apparatus, comprising:

a heat generating element, which is located in an intake air flow and is heated by heating power supplied by a supply circuit, and which comprises a heater having a thermal characteristic such that its resistance value varies in response to changes in temperature;

a system control switch for setting the air flow operation state;

first signal generating means, which generates first signals corresponding to a start pulse signal, at predetermined intervals, while said system control switch is turned on;

second signal generating means, which includes means for detecting the rise of temperature above a specified temperature of said heat generating element to which heating power, which is controlled by the rise of said first signals, is supplied, and which generates a second signal having a pulse corresponding to the time period after the rise of said first signals up to the detection of the temperature rise of said heat generating element;

measurement output signal generating means, which generates a signal having a pulse width corresponding to the time period of said second signal and controls the time period of the supply of heating power to said heat generating element;

burn-off start-detecting means for detecting that the power supply to said first signal generating means is stopped by the opening of said system control switch, to thereby detect a state in which the first signals are not generated by said first signal generating means;

burn-off time setting means for generating a burn-off control signal having a pulse width corresponding to a specified time period, after the opening of said system control switch is detected by said burn-off start-detecting means; and burn-off control means for supplying heating power to said heat generating element for a period equal to the pulse width of the burn-off control signal.

2. An apparatus according to claim 1, further comprising heating power control means, which reduces the power during the supply of heating power to said heat generating element by said burn-off control means.

3. An apparatus according to claim 2, wherein said heat power control means is provided with switching means, which includes a constant voltage circuit having a reference voltage source for setting the voltage of the power supplied to said heat generating element, and which switches the voltage of said reference voltage source to a low level during the supply to said heat generating element of heating power for said burn off.

4. An apparatus according to claim 1, wherein said detecting means includes comparing means, different voltage signals depending on whether said system control switch is closed or open being supplied to said comparing means for detecting the opening of said system control switch.

5. An apparatus according to claim 4, wherein said comparing means is provided with first and second comparators to which a first reference voltage V1 and a second reference voltage V2 lower than voltage V1 are supplied, and start pulse signals, are supplied to said first and second comparators when said system control switch is closed and a third voltage V3, which is set between the first and second voltages V1 and V2, is supplied when said system control switch is open, said comparing means detecting when said system control switch is open and said third voltage V3 is supplied to said comparators.

6. An apparatus according to claim 1, wherein said burn-off start-detecting means comprises means for detecting that said first signals are generated outside a specified time period.

7. An apparatus according to claim 6, wherein said burn-off start-detecting means includes an one-shot multivibrator, which generates a signal having a sufficiently wider pulse than the predetermined time intervals at which said first signals are generated, said first signals being supplied to said one-shot multivibrator as trigger signals.

8. An apparatus according to claim 1, wherein said burn-off time setting means comprises an one-shot multivibrator, which is driven by a signal for detecting that said system control switch is open, and which generates a signal having a pulse width sufficient for burn off.

9. An apparatus according to claim 1, further comprisng a switch element, which is provided in said supply circuit for turning said heating power to said heat generating element on and off, said switch element being turned on during the presence of said second signal and during the presence of said burn-off control signal.

10. An apparatus according to claim 9, wherein said switch element comprises a transistor, and the second signal and the burn-off control signal are supplied to the base of the transistor to turn on the transistor.

11. An apparatus according to claim 1, further comprising a switch element, which is provided in said supply circuit for turning said heating power to said heat generating element on and off, said switch element being turned on during the presence of said second signal and during the presence of said burn-off control signal, and a switching means provided between said switch element and said heating power source, said switching means being on when said system control switch is on and off when said burn off is completed.

12. An apparatus according to claim 11, wherein said switching means comprises a relay switch which is turned on by a driver circuit which generates a drive signal while said system control switch is on and while said burn off is being performed.

13. An apparatus according to claim 11, wherein said switching means comprising a transistor, a drive signal for turning on said transistor being supplied from a driver circuit while said system control switch is on and while said burn off is being performed.

14. A heat-wire type air flow measurement apparatus for an engine, comprising:
a power source;
an ignition switch connected to said power source for supplying electric power therethrough when closed;
bridge circuit means including a heater element disposed in an intake passage of said engine for measuring air flow when the electric power is supplied thereto;
first circuit means connected to said ignition switch for producing a first output signal for instructing air flow measurement when supplied with the electric power through said ignition switch;
second circuit means connected to said first circuit means, and supplied with electric power from said power source bypassing said ignition switch even when said ignition switch is opened, for producing a second output signal having a predetermined interval of time in response to disappearance of said first output signal and opening of said ignition switch; and
third circuit means connected to said second circuit means and between said bridge circuit means and said power source for supplying said bridge circuit means with the electric power from said power source in response to said second output signal so that said heater element of said bridge circuit means generates heat to burn off dust thereon.

15. An apparatus according to claim 14, wherein said third circuit means includes means for reducing the electric power supplied to said bridge circuit means when the second output signal is produced.

16. An apparatus according to claim 14, further comprising a relay disposed between said power source and said third circuit means, and closed in response to said second output signal for supplying said bridge circuit means and said second circuit means with the electric power even after said ignition switch is opened.

* * * * *